(12) United States Patent
Wang et al.

(10) Patent No.: US 12,259,685 B2
(45) Date of Patent: Mar. 25, 2025

(54) HOLOGRAPHIC DISPLAY DEVICE AND DISPLAY METHOD THEREOF

(71) Applicant: BOE Technology Group Co., Ltd., Beijing (CN)

(72) Inventors: Qian Wang, Beijing (CN); Gaolei Xue, Beijing (CN); Zhongxiao Li, Beijing (CN); Pengxia Liang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/291,280

(22) PCT Filed: Jul. 27, 2022

(86) PCT No.: PCT/CN2022/108149
§ 371 (c)(1),
(2) Date: Jan. 23, 2024

(87) PCT Pub. No.: WO2023/016254
PCT Pub. Date: Feb. 16, 2023

(65) Prior Publication Data
US 2024/0345541 A1    Oct. 17, 2024

(30) Foreign Application Priority Data

Aug. 12, 2021    (CN) .......................... 202110924489.1

(51) Int. Cl.
*G09G 3/36* (2006.01)
*G02F 1/133* (2006.01)
(Continued)

(52) U.S. Cl.
CPC ....... *G03H 1/2294* (2013.01); *G02F 1/13306* (2013.01); *G02F 1/133512* (2013.01);
(Continued)

(58) Field of Classification Search
CPC .............. G03H 1/2294; G03H 1/2286; G03H 2222/13; G03H 2225/22; G03H 2225/34;
(Continued)

(56) References Cited

U.S. PATENT DOCUMENTS

2009/0122221 A1* 5/2009 Lee ................... G02F 1/133308
445/24
2010/0231843 A1* 9/2010 Tadaki .............. G02F 1/133377
445/24

(Continued)

FOREIGN PATENT DOCUMENTS

CN     101226325 A    7/2008
CN     102033413 A    4/2011
(Continued)

OTHER PUBLICATIONS

International Search Report and Written Opinion received for PCT Patent Application No. PCT/CN2022/108149, mailed on Aug. 30, 2022, 12 pages (6 pages of English Translation and 6 pages of Original Document).

(Continued)

*Primary Examiner* — Sanghyuk Park
(74) *Attorney, Agent, or Firm* — ArentFox Schiff LLP; Michael Fainberg

(57) ABSTRACT

A holographic display device and a display method thereof. The holographic display device comprises a backlight module and two liquid crystal modules. The backlight module is used for providing coherent light; the two liquid crystal modules are located on the light exit side of the backlight module, and the two liquid crystal modules are stacked; one of the two liquid crystal modules is used for performing amplitude modulation on incident light, and the other one is used for performing phase modulation on incident light. In (Continued)

this way, the complex amplitude of exit light is adjusted, and the quality of a reconstructed image is improved.

15 Claims, 7 Drawing Sheets

(51) Int. Cl.
*G02F 1/1335* (2006.01)
*G02F 1/1337* (2006.01)
*G02F 1/1339* (2006.01)
*G02F 1/1347* (2006.01)
*G03H 1/22* (2006.01)
*G09G 3/00* (2006.01)
*G09G 3/34* (2006.01)

(52) U.S. Cl.
CPC .. *G02F 1/133531* (2021.01); *G02F 1/133622* (2021.01); *G02F 1/1337* (2013.01); *G02F 1/13394* (2013.01); *G02F 1/13398* (2021.01); *G02F 1/1347* (2013.01); *G03H 1/2286* (2013.01); *G09G 3/003* (2013.01); *G09G 3/3413* (2013.01); *G09G 3/3607* (2013.01); *G03H 2222/12* (2013.01); *G03H 2222/13* (2013.01); *G03H 2225/22* (2013.01); *G03H 2225/34* (2013.01); *G09G 2320/0209* (2013.01)

(58) Field of Classification Search
CPC ........... G02F 1/13306; G02F 1/133512; G02F 1/133531; G02F 1/133622; G02F 1/1337; G02F 1/13394; G02F 1/13398; G02F 1/1347; G09G 3/3413–3607; G09G 2320/0209

See application file for complete search history.

(56) References Cited

U.S. PATENT DOCUMENTS

| | | | |
|---|---|---|---|
| 2015/0023055 A1* | 1/2015 | Hwang | F21K 9/64 |
| | | | 362/84 |
| 2018/0259904 A1 | 9/2018 | Georgiou et al. | |
| 2018/0284546 A1* | 10/2018 | Tsuda | G02F 1/1347 |
| 2019/0257993 A1* | 8/2019 | Kim | G02F 1/133602 |
| 2021/0200012 A1 | 7/2021 | Zeng et al. | |
| 2022/0244592 A1* | 8/2022 | Jang | G02F 1/133531 |

FOREIGN PATENT DOCUMENTS

| | | |
|---|---|---|
| CN | 109254425 A | 1/2019 |
| CN | 208818950 U | 5/2019 |
| CN | 111045230 A | 4/2020 |
| CN | 112764280 A | 5/2021 |
| EP | 2482117 A1 | 8/2012 |
| JP | H05-127139 A | 5/1993 |
| JP | H05-323859 A | 12/1993 |

OTHER PUBLICATIONS

Office Action received for Chinese Patent Application No. 202110924489.1, mailed on Oct. 31, 2024, 20 pages (10 pages of English Translation and 10 pages of Original Document).

* cited by examiner

HOLOGRAPHIC DISPLAY DEVICE AND DISPLAY METHOD THEREOF

CROSS-REFERENCE TO RELATED APPLICATIONS

This application is a National Stage of International Application No. PCT/CN2022/108149, filed on Jul. 27, 2022, which claims priority to Chinese Patent Application No. 202110924489.1, filed to the China National Intellectual Property Administration on Aug. 12, 2021, and entitled "HOLOGRAPHIC DISPLAY DEVICE AND DISPLAY METHOD THEREOF", the entire content of which is incorporated herein by reference.

TECHNICAL FIELD

The present disclosure relates to the field of a display technology, in particular to a holographic display device and a display method thereof.

BACKGROUND

A three-dimensional display technology can provide a more real and three-dimensional telepresence and becomes a research hotspot in the field of display in recent years. Three-dimensional display applied widely at present is to form a three-dimensional display effect by using binocular parallax and brain fusion. However, the three-dimensional display based on parallax further has problems of being low in resolution, small in field angle, prone to causing a vergence-accommodation conflict and the like. Holographic display may reconstruct a three-dimensional image with depth information in a form of recording and reconstructing an object light wave, which is more suitable for viewing habits of people's eyes.

However, current holographic display can modulate only an amplitude or a phase, so quality of a reconstructed image needs to be improved.

SUMMARY

A first aspect of embodiments of the present disclosure provide a holographic display device, including:
 a backlight module, configured to provide coherent light; and
 two liquid crystal modules, located at a light-emitting side of the backlight module and stacked; where one of the two liquid crystal modules is configured for performing amplitude modulation on incident light, and the other one of the two liquid crystal modules is configured for performing phase modulation on the incident light.

In some embodiments of the present disclosure, the liquid crystal module configured for performing amplitude modulation on the incident light is a first liquid crystal module; the liquid crystal module configured for performing phase modulation on the incident light is a second liquid crystal module; and
 the first liquid crystal module is located at the light-emitting side of the backlight module, and the second liquid crystal module is located at a side of the first liquid crystal module facing away from the backlight module.

In some embodiments of the present disclosure, the two liquid crystal modules include:
 a first substrate;
 a second substrate, disposed opposite to the first substrate;
 a third substrate, located at a side of the second substrate facing away from the first substrate;
 a first liquid crystal layer, located between the first substrate and the second substrate; and
 a second liquid crystal layer, located between the second substrate and the third substrate.

In some embodiments of the present disclosure, the two liquid crystal modules further include:
 a first polarization layer, located at a side of the first liquid crystal module facing away from the second liquid crystal module; and
 a second polarization layer, located at a side of the second liquid crystal module facing away from the first liquid crystal module;
 a polarization direction of the first polarization layer is perpendicular to a polarization direction of the second polarization layer.

In some embodiments of the present disclosure, the two liquid crystal modules further include: a first orientation layer and a second orientation layer located at two sides of the first liquid crystal layer, respectively, and a third orientation layer and a fourth orientation layer located at two sides of the second liquid crystal layer, respectively;
 an orientation of first orientation layer is perpendicular to an orientation of the second orientation layer, and an orientation of the third orientation layer is parallel to an orientation of the fourth orientation layer; the orientation of the first orientation layer is parallel to the polarization direction of the first polarization layer; and the orientation of the fourth orientation layer is parallel to the polarization direction of the second polarization layer.

In some embodiments of the present disclosure, a thickness of the second substrate is less than 200 μm.

In some embodiments of the present disclosure, the first liquid crystal module further includes a plurality of first sub-pixel units, and the second liquid crystal module further includes a plurality of second sub-pixel units;
 one first sub-pixel unit corresponds to at least one second sub-pixel unit.

In some embodiments of the present disclosure, second sub-pixel units corresponding to the first sub-pixel unit are distributed in central symmetry with respect to a central point of the first sub-pixel unit.

In some embodiments of the present disclosure, an orthographic projection of the central point of an opening region of the first sub-pixel unit on the backlight module coincides with an orthographic projection, on the backlight module, of a central point of an opening region of a second sub-pixel unit located in a center among the corresponding second sub-pixel units.

In some embodiments of the present disclosure, a size of the opening region of the first sub-pixel unit is greater than a size of the opening region of the second sub-pixel unit.

In some embodiments of the present disclosure, the size of the opening region of the first sub-pixel unit is greater than or equal to 3 μm, and the size of the opening region of the second sub-pixel unit is greater than or equal to 3 μm.

In some embodiments of the present disclosure, the two liquid crystal modules further include:
 a light shielding layer, located at a side of the third substrate facing the second liquid crystal layer and including a plurality of openings exposing opening regions of the second sub-pixel units;
 a plurality of light-shield support pillars, located between the second substrate and the third substrate and arranged along edges of the opening regions of the second sub-pixel units according to a pattern of the light shielding layer.

In some embodiments of the present disclosure, an orthographic projection of the light shielding layer on the second substrate completely covers an orthographic projection of each light-shield support pillar on the second substrate.

In some embodiments of the present disclosure, a shape of each opening of the light shielding layer is a square, a rhombus, a circle, or a regular hexagon.

In some embodiments of the present disclosure, edges of the same sides of the first substrate, the second substrate and the third substrate are provided with a positioning hole, and orthographic projections of positioning holes of the first substrate, the second substrate and the third substrate on the backlight module overlap one another.

In some embodiments of the present disclosure, emergent light of the backlight module is laser light.

In some embodiments of the present disclosure, the backlight module at least provides laser light of two colors and is configured to emit laser light of different colors in time division.

In some embodiments of the present disclosure, the holographic display device further includes:
    a processor, connected with the backlight module and the two liquid crystal modules and configured to control the backlight module to emit the coherent light in a set timing according to holographic image data and provide a driving signal to the two liquid crystal modules, to cause the two liquid crystal modules to drive a corresponding liquid crystal module according to the driving signal to modulate the incident light to achieve holographic display.

A second aspect of the embodiments of the present disclosure provide a display method of a holographic display device, including:
    receiving holographic image data of an image to be displayed during holographic display;
    providing coherent light by a backlight module; and
    performing amplitude modulation and phase modulation on incident light by two liquid crystal modules respectively according to the holographic data to display a corresponding reconstructed image.

In some embodiments of the present disclosure, the holographic display device includes a processor connected with the backlight module and the two liquid crystal modules respectively;
    the processor is configured to receive the holographic data of the image to be displayed and generate, according to the holographic data, a driving signal used for controlling the backlight module and the two liquid crystal modules;
    the backlight module emits the coherent light in a set timing according to the driving signal provided by the processor; and
    the two liquid crystal modules perform amplitude modulation and phase modulation on the incident light of the backlight module respectively according to the driving signal provided by the processor.

In some embodiments of the present disclosure, the backlight module is configured to emit laser light of at least two colors, the liquid crystal module configured for performing amplitude modulation on the incident light is a first liquid crystal module, and the liquid crystal module configured for performing phase modulation on the incident light is a second liquid crystal module; the first liquid crystal module includes a plurality of first sub-pixel units, and the second liquid crystal module includes a plurality of second sub-pixel units;
    emitting, by the backlight module, the coherent light in the set timing according to the driving signal provided by the processor includes:
    for each frame of an image to be displayed, emitting, by the backlight module, laser light of different colors in time division in the set timing according to the driving signal provided by the processor; and
    performing, by the two liquid crystal modules, amplitude modulation and phase modulation on the incident light of the backlight module respectively according to the driving signal provided by the processor includes:
    for each frame of the image to be displayed, applying, by the first liquid crystal module, a driving signal corresponding to laser light of a current emitted color to each first sub-pixel unit respectively according to the driving signal provided by the processor, to cause the first liquid crystal module to perform repeated amplitude modulation on the laser light emitted by the backlight module; the quantity of times of performing amplitude modulation by the first liquid crystal module is the same as the quantity of types of colors of laser light emitted by the backlight module; and
    applying, by the second liquid crystal module, a corresponding driving signal to each second sub-pixel unit according to the driving signal provided by the processor, to cause the second liquid crystal module to perform phase modulation once on the laser light emitted by the backlight module.

In some embodiments of the present disclosure, the two liquid crystal modules include a first substrate and a second substrate disposed opposite to each other, and a third substrate located at a side of the second substrate facing away from the first substrate; edges of the same sides of the first substrate, the second substrate and the third substrate are provided with a positioning hole; and performing alignment on the substrates included in the two liquid crystal modules includes:
    disposing a receiver at a side of the first substrate facing away from the second substrate, and disposing an emitter at a side of the third substrate facing away from the second substrate;
    controlling the emitter to emit laser light to the receiver through positioning holes of the first substrate, the second substrate and the third substrate; and
    completing an alignment operation for substrates of the two liquid crystal modules in a case that a difference between an intensity of the laser light received by the receiver and an intensity of the laser light emitted by the emitter is less than a preset threshold.

BRIEF DESCRIPTION OF FIGURES

In order to more clearly describe technical solutions of embodiments of the present disclosure, drawings needed in the embodiments of the present disclosure will be briefly introduced below. Apparently, the drawings introduced below are only some embodiments of the present disclosure, and those ordinarily skilled in the art may also obtain other drawings according to these drawings without making creative efforts.

DETAILED DESCRIPTION

Figure 1:
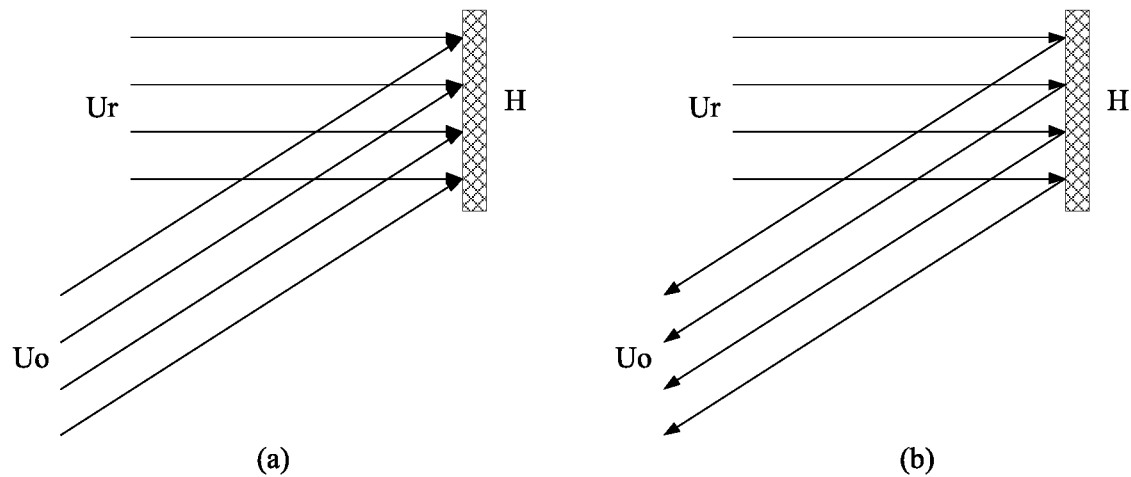
FIG. 1 is a schematic diagram of a principle of holographic display provided by an embodiment of the present disclosure.

In order to make the above purposes, features and advantages of the present disclosure clearer and easier to understand, the present disclosure is further described below with reference to the drawings and embodiments. However, exemplary implementations can be implemented in various forms and are not to be understood as being limited to the implementations described here, rather, these implementations are provided for making the present disclosure more comprehensive and complete and conveying a concept of the exemplary implementations to those skilled in the art comprehensively. The same reference numerals in the figures represent the same or similar structures, so repeated descriptions about them are omitted. Words for representing positions and direction described in the present disclosure are all described by taking the drawings as an example, but changes may be made as needed, and the changes are included in the protection scope of the present disclosure. The drawings of the present disclosure are only used for illustrating a relative position relationship but do not represent a true scale.

A three-dimensional display technology can provide a more real and three-dimensional telepresence and becomes a research hotspot in the field of display in recent years. Three-dimensional display applied widely at present is to form a three-dimensional display effect by using binocular parallax and brain fusion. However, the three-dimensional display based on parallax further has problems of being low in resolution, small in field angle, prone to causing a vergence-accommodation conflict and the like. Holographic display may reconstruct a three-dimensional image with depth information in a form of recording and reconstructing an object light wave, which is more suitable for viewing habits of people's eyes.

FIG. 1 is a schematic diagram of a principle of holographic display provided by an embodiment of the present disclosure.

As shown in FIG. 1, a conventional holographic technology includes two processes. A process (a) in FIG. 1 is a recording process, and a process (b) in FIG. 1 is a reconstructing process. In a recording stage, a beam of reference light wave Ur interferes with an object light wave Uo, a pattern caused by interference of the object light wave Uo and the reference light wave Ur is recorded on a photosensitive material H, and the interference pattern carries information related to a surface feature of an object. In a reconstructing stage, the same reference light wave Ur is used for irradiating the interference pattern of the photosensitive material H so as to reconstruct the same image as an original object.

The holographic technology may be applied to two-dimensional image display and also applied to three-dimensional image display.

With continuous development of a computer technology and a display technology, a holographic function may be obtained through modeling and algorithm implementation in the recording process of a hologram, and in the reconstructing process, coherent light is used for irradiating a display medium so as to display a reconstructed image.

However, a current hologram may modulate only one dimension of an amplitude or a phase, so the quality of the reconstructed image needs to be improved.

In view of this, embodiments of the present disclosure provide a holographic display device, which may perform modulation on a complex amplitude during reconstructing, so as to improve the image quality of the reconstructed image.

Figure 2:
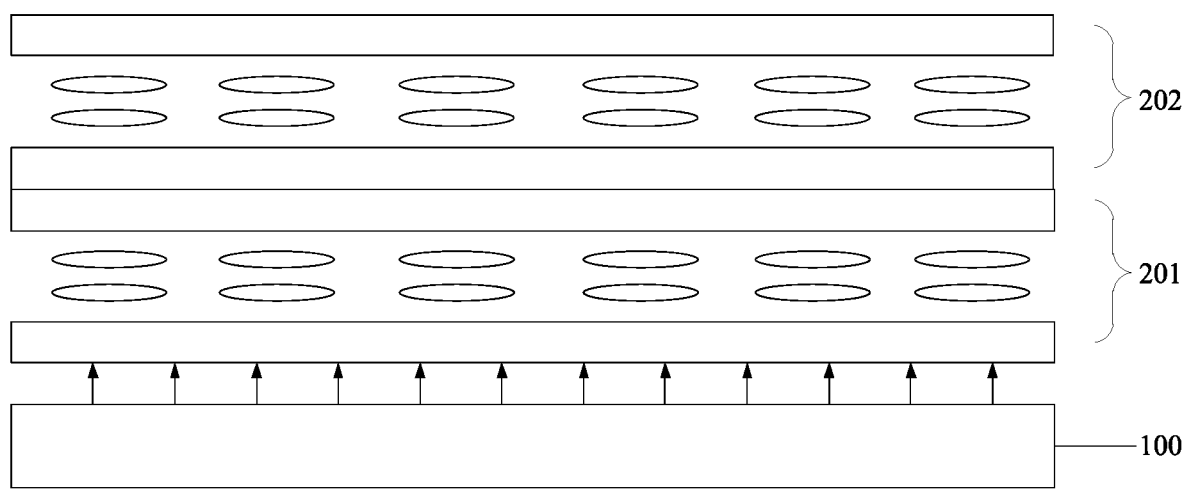
FIG. 2 is a first schematic structural diagram of a holographic display device provided by an embodiment of the present disclosure.

FIG. 2 is a first schematic structural diagram of a holographic display device provided by the embodiments of the present disclosure.

As shown in FIG. 2, the holographic display device includes: a backlight module 100 and two liquid crystal modules.

The backlight module 100 is located at a light incident side of the two liquid crystal modules. The backlight module 100 is configured to provide coherent light as a reference light wave of a reconstructed image.

The two liquid crystal modules are a first liquid crystal module 201 and a second liquid crystal module 202 respectively, and the first liquid crystal module 201 and the second liquid crystal module 202 are stacked. One of the two liquid crystal modules is configured for performing amplitude modulation on incident light, and the other one is configured for performing phase modulation on the incident light.

A hologram may represent a plural form: $A\exp(i\varphi)$, where A represents an amplitude, and $\varphi$ represents a phase. During the reconstruction of the hologram, the image quality of a reconstructed image obtained by modulating a complex amplitude is better than the image quality of a reconstructed image obtained by modulating only the phase; and the image quality of the reconstructed image obtained by modulating only the phase is better than the image quality of a reconstructed image obtained by modulating only the amplitude.

In this embodiment of the present disclosure, by disposing the two stacked liquid crystal modules on the light-emitting side of the backlight module and modulating the amplitude and the phase through the two liquid crystal modules respectively, modulation of the complex amplitude of the hologram is implemented, and thus the image quality of the reconstructed image is effectively improved.

If the liquid crystal module configured for performing amplitude modulation on the incident light is called the first liquid crystal module 201, and the liquid crystal module configured for performing phase modulation on the incident light is called the second liquid crystal module 202, during specific implementation, as shown in FIG. 2, the first liquid crystal module 201 may be located at the light-emitting side of the backlight module 100, and the second liquid crystal module 202 is located at a side of the first liquid crystal module 201 facing away from the backlight module 100.

After the coherent light emitted by the backlight module 100 enters the first liquid crystal module 201, the first liquid crystal module 201 modulates only the amplitude of the incident light, so after modulation by the first liquid crystal module 201, emergent light changes only in intensity and remains the coherent light, and its wavefront consistency is maintained. After the light modulated by the first liquid crystal module 201 enters the second liquid crystal module 202, the second liquid crystal module 202 modulates only the phase of the incident light without changing an intensity of the emergent light. Thus, after the light is subjected to amplitude modulation and phase modulation by the first liquid crystal module 201 and the second liquid crystal module 202, the emergent light not only includes an amplitude signal of an object light wave, but also includes phase information, so that the image quality of the reconstructed image is improved remarkably.

In some embodiments, the second liquid crystal module 202 may also be disposed at the light-emitting side of the backlight module 100, and the first liquid crystal module 201 is disposed at a side of the second liquid crystal module 202 facing away from the backlight module 100. The first liquid crystal module 201 is only configured for performing amplitude modulation on the incident light, the second liquid crystal module 202 is only configured for performing phase modulation on the incident light, and thus the embodiment of the present disclosure does not limit positions of the first liquid crystal module 201 and the second liquid crystal module 202.

Figure 3:
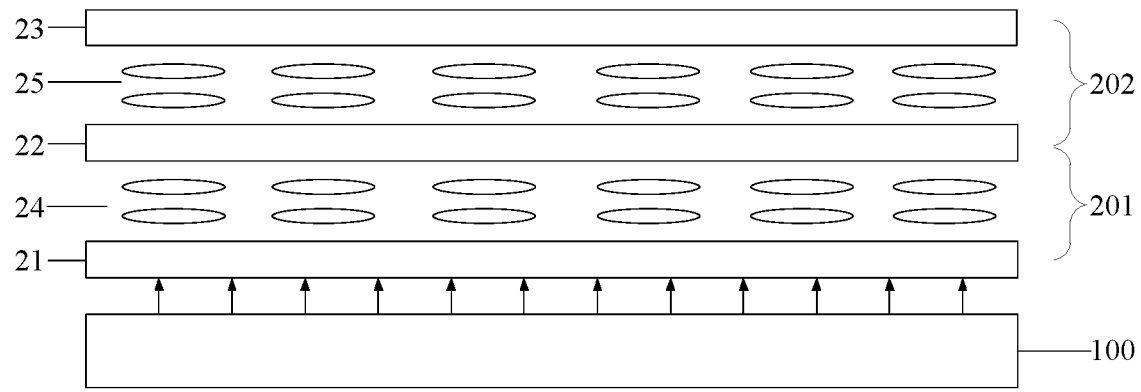
FIG. 3 is a second schematic structural diagram of a holographic display device provided by an embodiment of the present disclosure.

FIG. 3 is a second schematic structural diagram of a holographic display device provided by the embodiments of the present disclosure.

As shown in FIG. 3, a first liquid crystal module 201 and a second liquid crystal module 202 may each adopt a liquid crystal cell, which include: a first substrate 21, a second substrate 22, a third substrate 23, a first liquid crystal layer 24 and a second liquid crystal layer 25.

The first substrate 21 is disposed opposite to the second substrate 22, and a set distance exists between the first substrate 21 and the second substrate 22. The third substrate 23 is located at a side of the second substrate 22 facing away from the first substrate 21, the third substrate 23 is disposed opposite to the second substrate 22, and a set distance exists between the third substrate 23 and the second substrate 22. The first liquid crystal layer 24 is located between the first substrate 21 and the second substrate 22; and the second liquid crystal layer 25 is located between the second substrate 22 and the third substrate 23.

The first substrate 21, the first liquid crystal layer 24 and the second substrate 22 constitute the first liquid crystal module 201; and the second substrate 22, the second liquid crystal layer 25 and the third substrate 23 constitute the second liquid crystal module 202. The first liquid crystal module 201 and the second liquid crystal module 202 share the second substrate 22, so a whole thickness of the holographic display device may be reduced, a distance between the first liquid crystal layer 24 and the second liquid crystal layer 25 may further be shortened, and influence on the holographic image display caused by light diffraction is reduced.

In some embodiments, the first liquid crystal module 201 and the second liquid crystal module 202 may not share the substrate and adopt a form of sandwiching a layer of liquid crystals between two opposite substrates respectively. When the two independent liquid crystal modules are adopted, adjacent substrates of the two liquid crystal modules need to be bonded.

The embodiments of the present disclosure specifically describe a structure of the two liquid crystal modules by taking the two liquid crystal modules using three substrates as an example.

Figure 4:
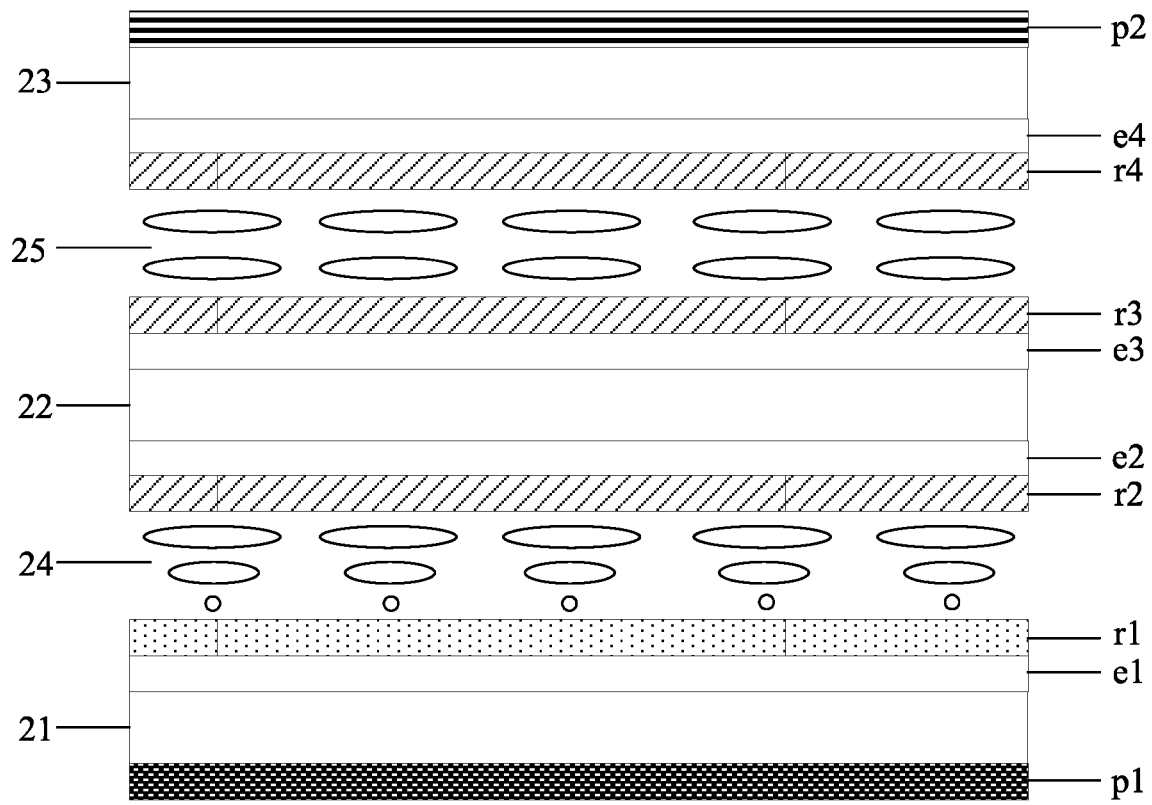
FIG. 4 is a third schematic structural diagram of a holographic display device provided by an embodiment of the present disclosure.

FIG. 4 is a third schematic structural diagram of a holographic display device provided by the embodiments of the present disclosure.

As shown in FIG. 4, two liquid crystal modules further include: a first polarization layer p1, a second polarization layer p2, a first orientation layer r1, a second orientation layer r2, a third orientation layer r3, a fourth orientation layer r4, a first electrode layer e1, a second electrode layer e2, a third electrode layer e3 and a fourth electrode layer e4.

Here, the first polarization layer p1 is located at a side of the first liquid crystal module facing away from the second liquid crystal module, i.e., located at a side of the first substrate 21 facing away from the second substrate 22. The second polarization layer p2 is located at a side of the second liquid crystal module facing away from the first liquid crystal module, i.e., located at a side of the third substrate 23 facing away from the second substrate 22.

In the embodiments of the present disclosure, the two polarization layers are disposed only at a light incident side and a light-emitting side of the two liquid crystal modules respectively, and a polarization direction of the first polarization layer p1 is perpendicular to a polarization direction of the second polarization layer p2.

The first orientation layer r1 and the second orientation layer r2 are located at two sides of the first liquid crystal layer 24 respectively, and the third orientation layer r3 and the fourth orientation layer r4 are located at two sides of the second liquid crystal layer 25 respectively.

Here, an orientation of the first orientation layer r1 is perpendicular to an orientation of the second orientation layer r2, an orientation of the third orientation layer r3 is parallel to an orientation of the fourth orientation layer r4, the orientation of the first orientation layer r1 is parallel to the polarization direction of the first polarization layer p1, and the orientation of the fourth orientation layer r4 is parallel to the polarization direction of the second polarization layer p2.

The orientations of the first orientation layer r1 and the second orientation layer r2 on the two sides of the first liquid crystal layer 24 are perpendicular to each other, liquid crystal molecules in the first liquid crystal layer 24 are arranged at a side close to the first orientation layer r1 in an orientation direction of the first orientation layer r1, the liquid crystal molecules rotate in a direction away from the first orientation layer r1 and are finally arranged at a side close to the second orientation layer r2 in an orientation direction of the second orientation layer r2, and thus a twisted nematic (TN) liquid crystal module is formed. The TN liquid crystal module may modulate only the amplitude of the incident light and may not change the phase of the incident light, so that wavefront consistency of the emergent light wave is maintained.

The orientations of the third orientation layer r3 and the fourth orientation layer r4 on the two sides of the second liquid crystal layer 25 are parallel to each other, liquid crystal molecules in the second liquid crystal layer 25 are arranged in orientation directions of the third orientation layer r3 and the fourth orientation layer r4, and thus an electrically controller birefringence (ECB) liquid crystal module is formed. The ECB liquid crystal module uses dielectric anisotropy of the liquid crystal molecules, the liquid crystal molecules turn over during voltage applying, which changes a refractive index of the second liquid crystal layer and modulates the phase of the incident light. The ECB liquid crystal module does not turn an azimuth angle, and a use ratio of a refractive index of the liquid crystal molecules is large. The ECB liquid crystal module is used for implementing phase modulation of 0 to $2\pi$.

Figure 5:
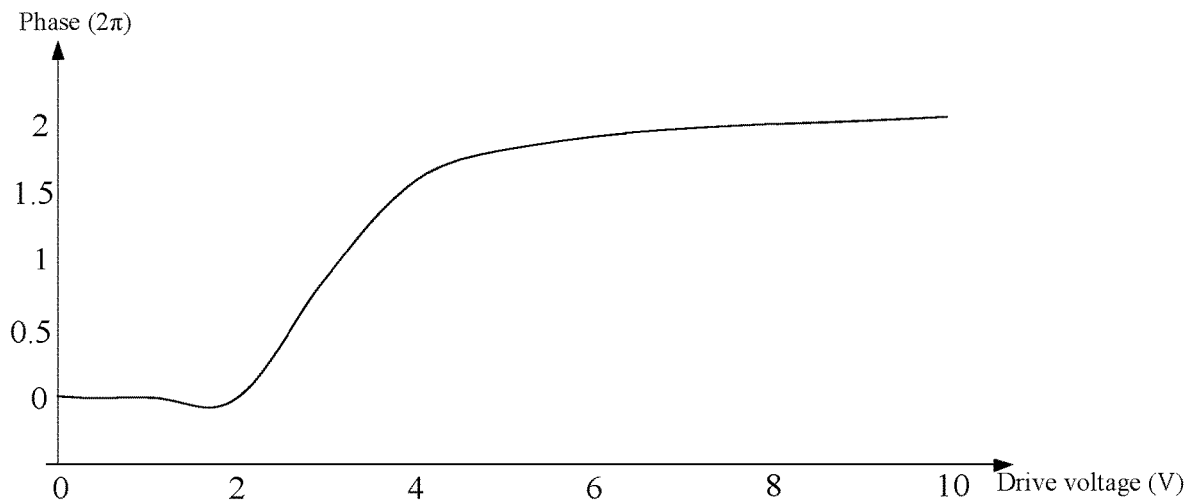
FIG. 5 is a curve of phase modulation provided by an embodiment of the present disclosure.

FIG. 5 is a curve of phase modulation provided by the embodiments of the present disclosure.

As shown in FIG. 5, when the incident light is red light of 671 nm and the ECB liquid crystal module uses liquid crystals of an SLC123320 model, a refractive index difference is 0.299, and a drive voltage is 8 V, which may implement phase modulation of $2\pi$.

The ECB liquid crystal module modulates only the phase of the incident light and does not change an intensity of the incident light.

Figure 6:
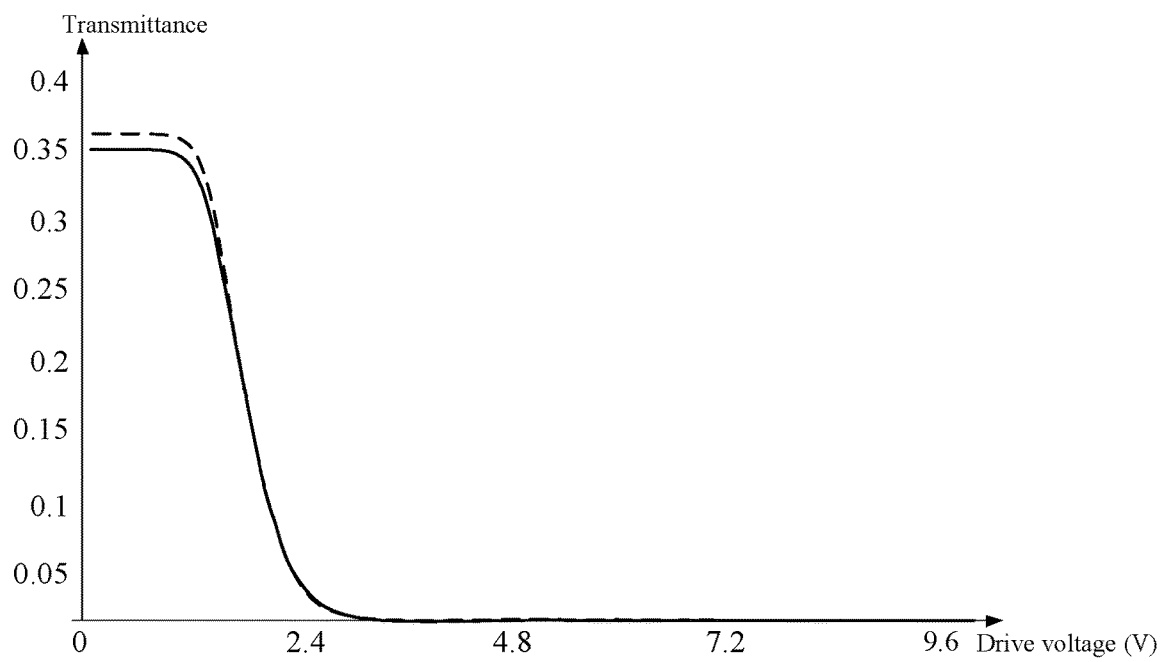
FIG. 6 is a transmittance curve chart of light passing through two liquid crystal modules provided by an embodiment of the present disclosure.

FIG. 6 is a transmittance curve chart of light passing through two liquid crystal modules provided by the embodiments of the present disclosure. The solid line represents a transmittance curve of light passing only through the first liquid crystal module (namely, the TN liquid crystal module); and the dotted line represents a transmittance curve of light passing through the first liquid crystal module (namely, the TN liquid crystal module) and the second liquid crystal module (namely, the ECB liquid crystal module).

It may be seen from FIG. 6 that the transmittance curves substantially overlap when the light independently passes through the first liquid crystal module and the light passes first through the first liquid crystal module and then through the second liquid crystal module, which indicates that the ECB liquid crystal module may not affect the intensity of the incident light.

The first liquid crystal module 201 is only configured for modulating the amplitude (namely, the intensity) of the incident light, the second liquid crystal module 202 is only configured for modulating the phase of the incident light, the first liquid crystal module and the second liquid crystal module do not affect each other, so a certain included angle may be allowed to exist between an orientation direction of the liquid crystal molecules in the second liquid crystal layer 25 and an orientation direction of liquid crystal molecules at a side of the first liquid crystal layer 24 close to the second substrate 22, assembling difficulty of the first liquid crystal layer and the second liquid crystal layer may be reduced. It only needs to be guaranteed that a transmission axis (namely, the polarization direction) of the second polarization layer p2 on the second liquid crystal module is parallel to the orientation direction of the liquid crystal molecules of the second liquid crystal layer 25 in the second liquid crystal module, so that the light passing through the second liquid crystal module may be emitted directly, and brightness loss caused when passing through the second polarization layer p2 is avoided.

During specific implementation, the first polarization layer p1 and the second polarization layer p2 may adopt an absorptive-type polarization layer or a reflection-type polarization layer. When the absorptive-type polarization layer (polarizer, POL for short), a conventional polarizer may be directly attached to surfaces of the first substrate 21 and the third substrate 23. When the reflection-type polarization layer is adopted, for example, a wire grid polarizer (WGP) may be adopted, and a wire grid may be made directly on the surface of the first substrate 21 and/or the third substrate 23, so as to achieve a polarization effect. It needs to be noted that due to a reflection effect of the WGP on the incident light, reflection may be caused if the WGP is disposed on the surface of the third substrate 23, which affects experience of a viewer, so the WGP may be disposed only at a side of the first substrate 21, and the polarization layer at a side of the third substrate 23 still adopts a conventional polarizer.

Still referring to FIG. 4, the first liquid crystal module further includes a first electrode layer e1 and a second electrode layer e2, the first electrode layer e1 is located between the first substrate 21 and the first orientation layer r1, and the second electrode layer e2 is located between the second substrate 22 and the second orientation layer r2.

The second liquid crystal module further includes a third electrode layer e3 and a fourth electrode layer e4, the third electrode layer e3 is located between the second substrate 22 and the third orientation layer r3, and the fourth electrode layer e4 is located between the third substrate 23 and the fourth orientation layer r4.

Electrodes are disposed at two sides of the first liquid crystal layer 24 and two sides of the second liquid crystal layer 25 respectively, so the first liquid crystal module (the TN liquid crystal module) and the second liquid crystal module (the ECB liquid crystal module) are driven by a vertical electric field.

One of the first electrode layer e1 and the second electrode layer e2 is a pixel electrode layer, and the other one of the first electrode layer e1 and the second electrode layer e2 is a common electrode layer. One of the third electrode layer e3 and the fourth electrode layer e4 is a pixel electrode layer, and the other one of the third electrode layer e3 and the fourth electrode layer e4 is a common electrode layer. In order to prevent electric fields on two sides of the second substrate 22 from affecting each other, all the electrode layers at the two sides of the second substrate 22 adopt the common electrode layers, a pixel electrode layer of the first liquid crystal module is disposed at a side of the first substrate 21, and a pixel electrode layer of the second liquid crystal module is disposed at a side of the third substrate 23.

Here, the pixel electrode layer may adopt a patterned electrode, so that one pixel electrode corresponds to one sub-pixel unit. The common electrode layer may be disposed as a whole layer.

Figure 7:
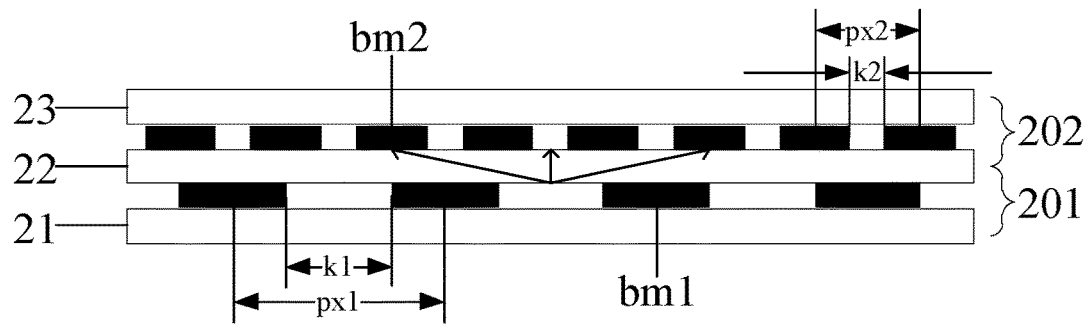
FIG. 7 is a schematic structural diagram of two liquid crystal modules provided by an embodiment of the present disclosure.

FIG. 7 is a schematic structural diagram of two liquid crystal modules provided by the embodiments of the present disclosure.

As shown in FIG. 7, the first liquid crystal module 201 further includes a plurality of first sub-pixel units px1, and the second liquid crystal module 202 further includes a plurality of second sub-pixel units px2. One first sub-pixel unit px1 corresponds to at least one second sub-pixel unit px2.

The emergent light of the backlight module first passes through the first sub-pixel units px1 for amplitude modulation and then enters the second sub-pixel units px2 for phase modulation. As the first sub-pixel units px1 and the second sub-pixel units px2 are close for a wavelength of the incident light, pinhole diffraction may be caused when the emergent light of the backlight module enters the first sub-pixel units px1 and the second sub-pixel units px2.

However, if a distance between opening regions of the first sub-pixel units px1 and the second sub-pixel units px2 is too large, a problem of image disorder may be caused. If a vertical distance between a position of the first liquid crystal layer 24 close to the second substrate 22 and a position of the second liquid crystal layer 25 close to the second substrate 22 is used as a distance between opening regions of the first sub-pixel units px1 and the second sub-pixel units px2, in the most ideal case, the distance between the first sub-pixel units px1 and the second sub-pixel units px2 is set as 0. But, during actual application, the second substrate 22 is at least disposed between the first liquid crystal layer 24 and the second liquid crystal layer 25, and the distance between the first sub-pixel units px1 and the second sub-pixel units px2 cannot be reduced to 0. By simulating the intensity and the phase of the emergent light, it is discovered that when the distance between the first sub-pixel units px1 and the second sub-pixel units px2 exceeds 200 μm, due to a diffraction effect, both the intensity and the phase change, which departs from an original design. Thus, in the embodiments of the present disclosure, the distance between the first sub-pixel units px1 and the second sub-pixel units px2 is set as being less than 200 μm. When a double-layer liquid crystal module structure shown in FIG. 3 and FIG. 4 is adopted, the two liquid crystal modules share the same substrate, one substrate is omitted, so that the distance between the first sub-pixel units px1 and the second sub-pixel units px2 may be effectively reduced. At the moment, a thickness of the second substrate 22 only needs to be reduced to less than 200 μm to meet a demand of imaging. During specific implementation, the thickness of the second substrate 22 may be set as 150 μm, 100 μm and the like, which is not limited here.

The holographic display device provided by the embodiments of the present disclosure performs complex amplitude modulation on the incident light, and the first sub-pixel units px1 and the second sub-pixel units px2 are required to have smaller sizes. The first sub-pixel units px1 have a smaller size, and the number of the first sub-pixel units px1 may be increased, so that an image resolution is improved. The second sub-pixel units px2 have a smaller size, which facilitates the occurrence of pinhole diffraction at the second sub-pixel units px2, thereby increasing the field angle under the effect of the diffraction.

Figure 8:
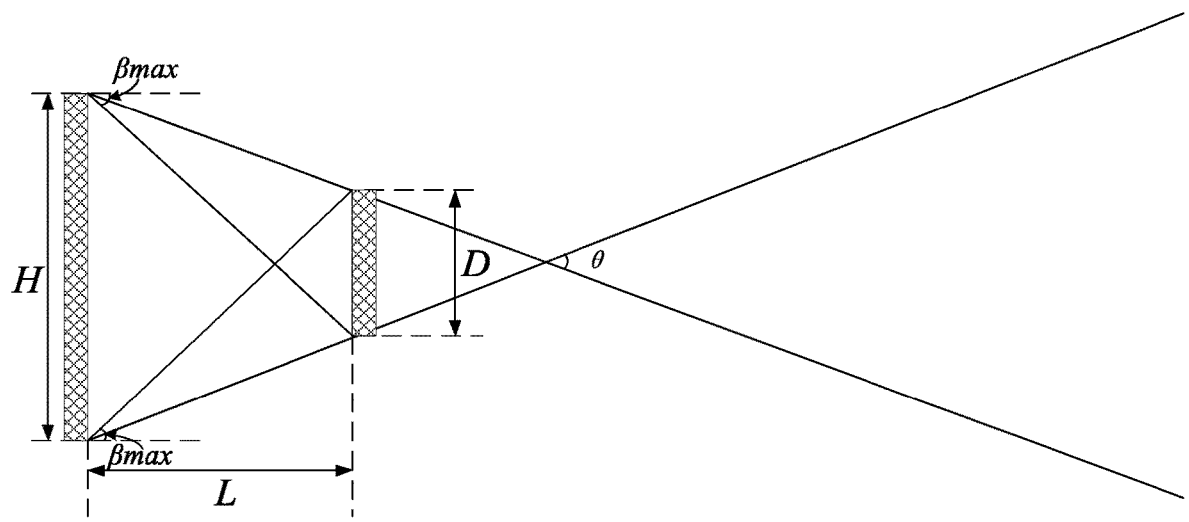
FIG. 8 is a diagram of a principle of calculating a field angle provided by an embodiment of the present disclosure.

FIG. 8 is a diagram of a principle of calculating a field angle provided by the embodiments of the present disclosure.

As shown in FIG. 8, when a size of the holographic display device is H, a size of a holographic reconstructed image is D, a distance between the holographic display device and the reconstructed image is L, a size of the opening region of each second sub-pixel unit px2 is p, and a diffraction angle of the opening region of each second sub-pixel unit px2 is βmax, the diffraction angle and the field angle meet the following relationship:

$$\beta \max = \arctan(\lambda/p);$$

and $$\theta = 2\arctan\frac{H-D}{(H+D)\cot(\beta\max)}.$$

According to the above formula, calculation is performed in a case that a size of the reconstructed image is half of a size of the holographic display device, when the size of the opening region of the second sub-pixel unit px2 is 3 μm, and if a wavelength of the incident light is 550 nm, the diffraction angle may be obtained through calculation: 2βmax=20°, and the field angle θ 13.8°; if the wavelength of the incident light is 650 nm, the diffraction angle may be obtained through calculation: 2βmax=24°, and the field angle θ 16.9°; and if the wavelength of the incident light is 473 nm, the diffraction angle may be obtained through calculation: 2βmax=17.9°, and the field angle θ 12.3°.

When the holographic display device is applied to near-eye display, a better display effect is achieved if the field angle is 10° or above. It may be seen from the above calculation result that when light of three primary colors such as red, green, and blue is used for image display, the field angle generated by light of different colors may all meet demands.

In view of the current technique limitation, the second substrate 22 may be thinned as smallest as about 30 μm, and considering the diffraction effect of the first sub-pixel units px1 and the second sub-pixel units px2 and the current etching process limitation, the sizes of the opening regions of the first sub-pixel units px1 and the second sub-pixel units px2 are each greater than or equal to 3 μm.

During specific implementation, a size of an opening region of the first sub-pixel unit px1 is greater than a size of an opening region of the second sub-pixel unit px2. The size of the opening region of the first sub-pixel unit px1 is set greater, so that the light transmittance may be increased and overall brightness of the displayed image is improved. The size of the opening region of the second sub-pixel unit px2 is set smaller, so that the field angle is increased by means of the diffraction effect of the second sub-pixel unit px2.

During actual application, the size of the opening region of the first sub-pixel unit px1 may be set as a magnitude of tens of microns, the size of the opening region of the second sub-pixel unit px2 may be set as a magnitude of several microns, for example, the size of the opening region of the first sub-pixel unit px1 is 24.5 μm, the size of the opening region of the second sub-pixel unit px2 is 3 μm, and the embodiments of the present disclosure do not limit a specific numerical value of the opening region of the sub-pixel unit.

As shown in FIG. 7, the two liquid crystal modules further include: a light shielding layer. The light shielding layer is divided into a first light shielding layer and a second light shielding layer. The first light shielding layer bm1 is located at a side of the second substrate 22 facing the first liquid crystal layer; and the second light shielding layer bm2 is located at a side of the third substrate 23 facing the second liquid crystal layer.

During specific implementation, a fabrication method of the light shielding layer may refer to a fabrication method of a color filter substrate in a liquid crystal display panel, the first light shielding layer bm1 includes a plurality of openings k1, only positions of openings k1 transmit light, other positions shield light, and a shape of each opening k1 of the first light shielding layer bm1 is consistent with a shape of the opening region of the first sub-pixel unit px1; and likewise, the second light shielding layer bm2 includes a plurality of openings k2, only positions of the openings k2 transmit light, other positions shield light, and a shape of each opening k2 of the second light shielding layer bm2 is consistent with a shape of the opening region of the second sub-pixel unit px2. Thus, the shape and the size of the opening region of the sub-pixel unit are adjusted by setting the shape and the size of the opening of the light shielding layer.

FIG. 9A to FIG. 9D are schematic diagrams of a shape of an opening region of a second sub-pixel unit provided by the embodiments of the present disclosure.

Figure 9A:
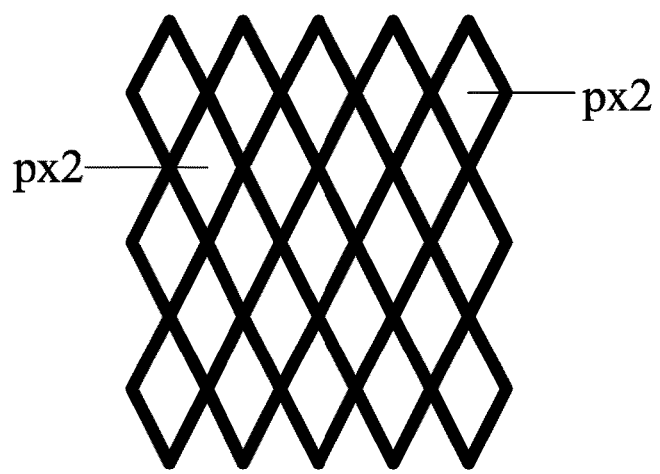
FIG. 9A is a schematic diagram of a shape of an opening region of a second sub-pixel unit provided by an embodiment of the present disclosure.
Figure 9B:
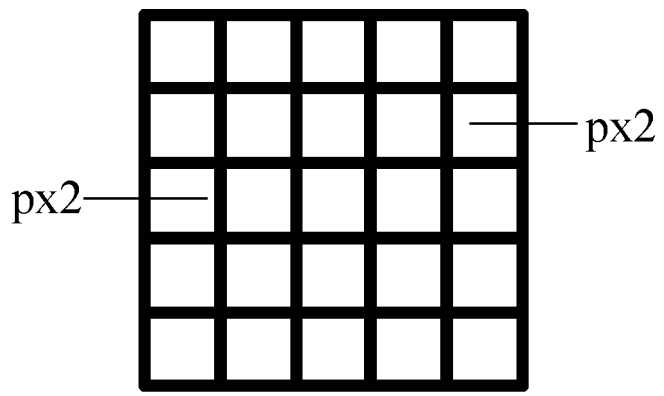
FIG. 9B is another schematic diagram of a shape of an opening region of a second sub-pixel unit provided by an embodiment of the present disclosure.
Figure 9C:
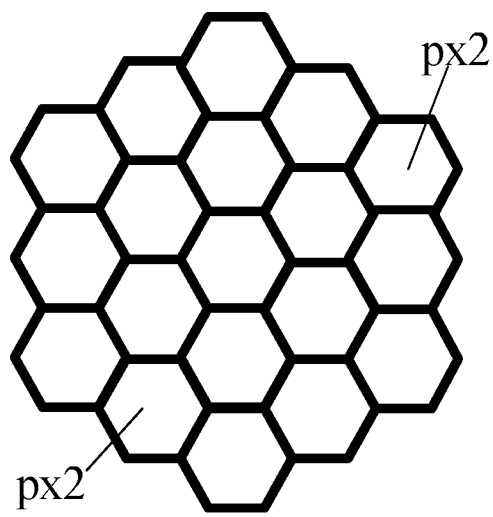
FIG. 9C is another schematic diagram of a shape of an opening region of a second sub-pixel unit provided by an embodiment of the present disclosure.
Figure 9D:
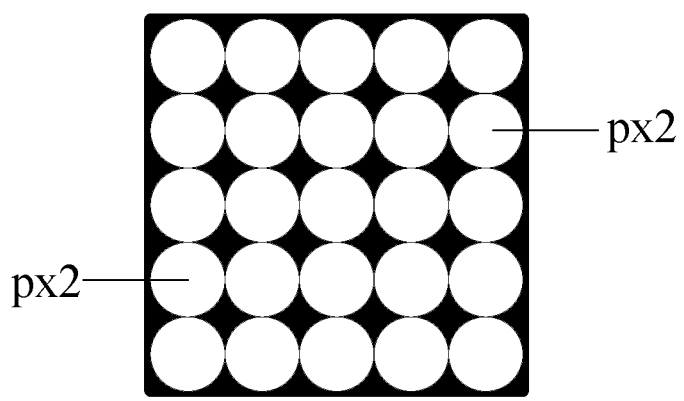
FIG. 9D is another schematic diagram of a shape of an opening region of a second sub-pixel unit provided by an embodiment of the present disclosure.

During specific implementation, as shown in FIG. 9A, the opening region of the second sub-pixel unit px2 may be set as a rhombus; or as shown in FIG. 9B, the opening region of the second sub-pixel unit px2 may be set as a square; or as shown in FIG. 9C, the opening region of the second sub-pixel unit px2 may be set as a regular hexagon; or as shown in FIG. 9D, the opening region of the second sub-pixel unit px2 may be set as a circle.

Setting of the shape of the opening region of each second sub-pixel unit px2 mainly depends on an azimuth angle that the holographic display device finally needs.

When the shape of the opening region of the second sub-pixel unit px2 adopts the rhombus shown in FIG. 9A, a long diagonal line of the rhombus may be set parallel to a direction which has a larger field of view in actual application. Besides, a rhombus structure is adopted for better dense arrangement of the sub-pixel units.

When the shape of the opening region of the second sub-pixel unit px2 adopts the square shown in FIG. 9B, the field angles corresponding to directions of four angles of the square are greater, distribution of the field of view is in a central symmetry structure. The square structure is consistent with a conventional pixel structure, which may be used directly by matching in technique.

When the shape of the opening region of the second sub-pixel unit px2 adopts the regular hexagon shown in FIG. 9C, the field angles corresponding to directions of six angles of the regular hexagon are greater, distribution of the field of view is in a central symmetry structure. A regular hexagon structure is adopted for better dense arrangement of the sub-pixel units. By using one sub-pixel unit as a center, six sub-pixel units may be disposed simultaneously along sides of the sub-pixel unit located in the center, respectively. Thus, the number of the sub-pixel units may be increased, which is conducive to improving the image resolution.

When the shape of the opening region of the second sub-pixel unit px2 adopts the circle shown in FIG. 9D, the field angles in all directions are equal, which is suitable for a scene with equal fields of view for viewing an image in all the directions.

When the second sub-pixel units px2 are arranged densely, crosstalk among pixels may be caused, in order to avoid the problem of pixel crosstalk, in the embodiments of the present disclosure, a plurality of light-shield support pillars are disposed between the second substrate 22 and the third substrate 23, and the light-shield support pillars are adopted for blocking light from entering an opening region between the adjacent second sub-pixel units.

Figure 10:
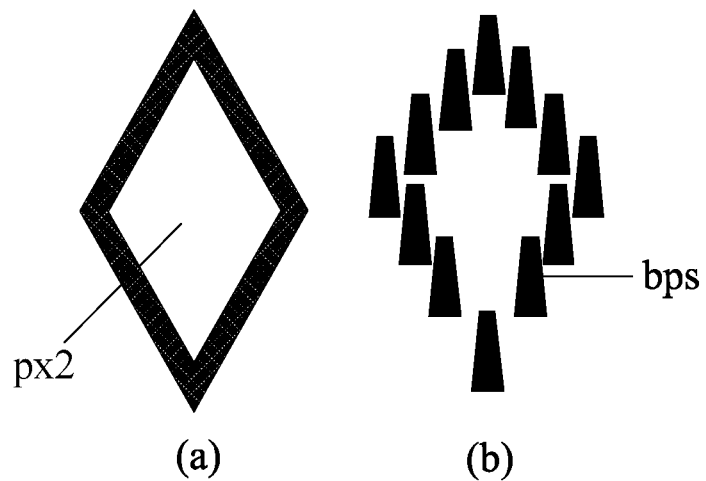
FIG. 10 is a schematic diagram of arrangement of second sub-pixel units and light-shield support pillars provided by an embodiment of the present disclosure.

FIG. 10 is a schematic diagram of arrangement of second sub-pixel units and light-shield support pillars provided by the embodiments of the present disclosure.

As shown in FIG. 10, the light-shield support pillars bps are arranged along edges of the opening regions of the second sub-pixel units px2 according to a pattern of the second light shielding layer bm2. The light-shield support pillars bps are arranged along edges of the opening regions of the second sub-pixel units px2, so the opening regions of the second sub-pixel units px2 may form a similarly-closed blocking wall, and thus mutual crosstalk of the light of the adjacent second sub-pixel units may be prevented. At the same time, the light-shield support pillars bps further play a role in keeping a fixed space between the second substrate and the third substrate, so that thicknesses of all positions of the second liquid crystal layer may remain equal.

It may be seen in figure (a) of FIG. 10 that the opening region of the second sub-pixel unit px2 is a rhombus, so the plurality of light-shield support pillars may be disposed in rhombus to form a rhombus contour, which is specifically shown in figure (b) of FIG. 10. When the second sub-pixel units px2 adopt the other shapes, the light-shield support pillars may be correspondingly arranged in corresponding shapes, which is not limited here.

In general, the light-shield support pillars bps are disposed below the second light shielding layer bm2, and an orthographic projection of the second light shielding layer bm2 on the second substrate completely covers an orthographic projection of each light-shield support pillar bps on the second substrate. In this way, the light-shield support pillars may be prevented from affecting emitting of the light of the opening regions of the second sub-pixel units.

The light-shield support pillars may be made of a block or dark-color resin material, for example, black photoresist or other materials, which is not limited here.

In some embodiments, if arrangement of the first sub-pixel units px1 is dense, the light-shield support pillars may also be disposed below the first light shielding layer bm1 correspondingly, an arrangement rule of which may be arrangement along edges of the first sub-pixel units px1, and thus the problem of light crosstalk between the adjacent first sub-pixel units px1 is avoided.

In this embodiment of the present disclosure, one first sub-pixel unit px1 corresponds to at least one second sub-pixel unit px2. One first sub-pixel unit px1 corresponding to one second sub-pixel unit px2 can effectively control the amplitude and the phase of the emergent light in corresponding positions. One first sub-pixel unit px1 corresponding to a plurality of second sub-pixel units px2 can improve the utilization ratio of the light.

Given that the emergent light of the first sub-pixel unit px1 needs to be subjected to optical modulation again by at least one second sub-pixel unit px2, in the embodiments of the present disclosure, the shape of the first sub-pixel unit px1 and the shape of the second sub-pixel unit px2 may be the same or approximately the same.

Figure 11:
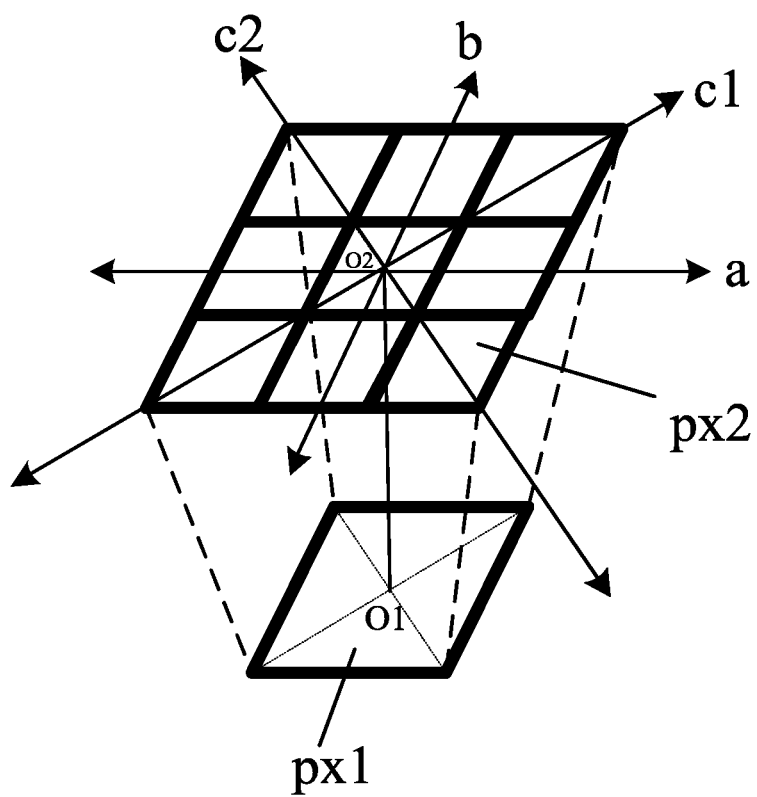
FIG. 11 is a schematic diagram of a corresponding relationship between first sub-pixel units and second sub-pixel units provided by an embodiment of the present disclosure.

FIG. 11 is a schematic diagram of a corresponding relationship between first sub-pixel units and second sub-pixel units provided by the embodiments of the present disclosure.

In general, the opening region of the first sub-pixel unit px1 may be set as a shape in central symmetry, so the distribution of the light after passing through the first sub-pixel unit px1 is also in central symmetry. As shown in FIG. 11, in the embodiments of the present disclosure, the second sub-pixel units px2 corresponding to the first sub-pixel unit px1 are a plurality of second sub-pixel units px2 within a light spot range formed when the emergent light of the first sub-pixel unit px1 irradiates the second substrate 22, and the second sub-pixel units px2 corresponding to the first sub-pixel unit px1 are distributed in central symmetry with respect to a central point of the first sub-pixel unit px1.

As shown in FIG. 11, an orthographic projection of the central point O1 of the opening region of the first sub-pixel unit px1 on the backlight module coincides with an orthographic projection, on the backlight module, of a central point O2 of the opening region of the second sub-pixel unit px2 located in a center among the corresponding second sub-pixel units.

Taking the pixel arrangement structure shown in FIG. 11 as an example, when the opening region of the second sub-pixel unit px2 is the rhombus, correspondingly, the opening region of the first sub-pixel unit px1 may also be disposed as the rhombus. The central point O1 of the opening region of one first sub-pixel unit px1 coincides with the central point O2 of the opening region of the second sub-pixel unit px2 located in the center, at the same time, the emergent light of the first sub-pixel unit px1 may cover the second sub-pixel units px2 in a 3×3 array, namely, in a horizontal direction a, a vertical direction b and two diagonal line directions c1 and c2, one first sub-pixel unit px1 corresponds to three second sub-pixel units px2.

Figure 12:
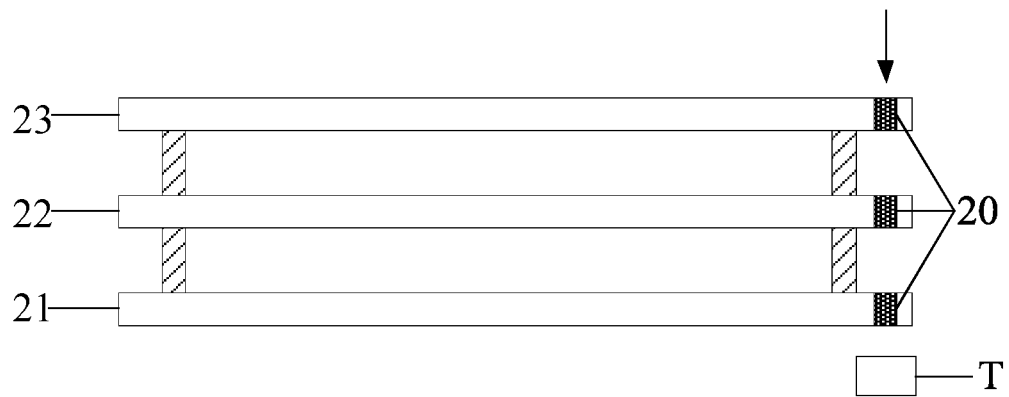
FIG. 12 is a fourth schematic structural diagram of a holographic display device provided by an embodiment of the present disclosure.

FIG. 12 is a fourth schematic structural diagram of a holographic display device provided by the embodiments of the present disclosure.

As shown in FIG. 12, positioning holes 20 are formed at edges of the same sides of the first substrate 21, the second substrate 22 and the third substrate 23 in the two liquid crystal modules, and orthographic projections of the positioning holes of the first substrate 21, the second substrate 22 and the third substrate 23 on the backlight module overlap one another.

During specific implementation, the holographic display device needs to have high PPI and alignment accuracy needs to be less than 2 μm. By using a structure of the positioning holes shown in FIG. 12, an alignment laser light beam is emitted to the positioning holes 20 at a side of the third substrate 23, and a receiver T is disposed at a side of the first substrate 21. By adjusting relative positions among the first substrate 21, the second substrate 22 and the third substrate 23 until the receiver T receives 100% or approximate 100% of the energy of the alignment light beam, at the moment, the alignment of the substrates be considered complete. Thus, the accuracy of the alignment is improved.

Reference light of the holographic display is the coherent light, thus, the backlight module in the embodiments of the present disclosure is configured to emit the laser light, the first liquid crystal module 201 is configured for performing amplitude modulation on the laser light emitted by the backlight module, and the second liquid crystal module 202 performs phase modulation on the emergent light of the first liquid crystal module 201, so that complex amplitude modulation on the holographic image is implemented, and the image quality of the holographic reconstructed image is improved.

The above holographic display device provided by the embodiments of the present disclosure is further provided with a processor not shown in the figure, and the processor is connected with the backlight module, the first liquid crystal module and the second liquid crystal module respectively. The processor may control the backlight module to emit the coherent light in a set timing according to holographic data and provide a driving signal for the first liquid crystal module and the second liquid crystal module, to cause the first liquid crystal module to perform amplitude modulation on the incident light according to the driving signal and cause the second liquid crystal module to perform phase modulation on the incident light according to the driving signal to achieve the high-quality holographic display.

In some embodiments, the laser light of different colors may be emitted in time division, for example, the backlight module may emit red laser light, green laser light and blue laser light in time division. At the moment, the processor may control the timing of the backlight module to emit the laser light of three colors, namely, red, green and blue, where a switching frequency of red, green and blue laser light needs to be greater than a resolvable frequency of human eyes. At the same time, when the backlight module emits the red laser light, a first driving signal is provided for the first liquid crystal module and the second liquid crystal module for modulating the amplitude and the phase of the red laser light; when the backlight module emits the green laser light, a second driving signal is provided for the first liquid crystal module and the second liquid crystal module for modulating the amplitude and the phase of the green laser light; and when the backlight module emits the blue laser light, a third driving signal is provided for the first liquid crystal module and the second liquid crystal module for modulating the amplitude and the phase of the blue laser light. Thus, full-color display of the holographic display device is implemented.

Figure 13:
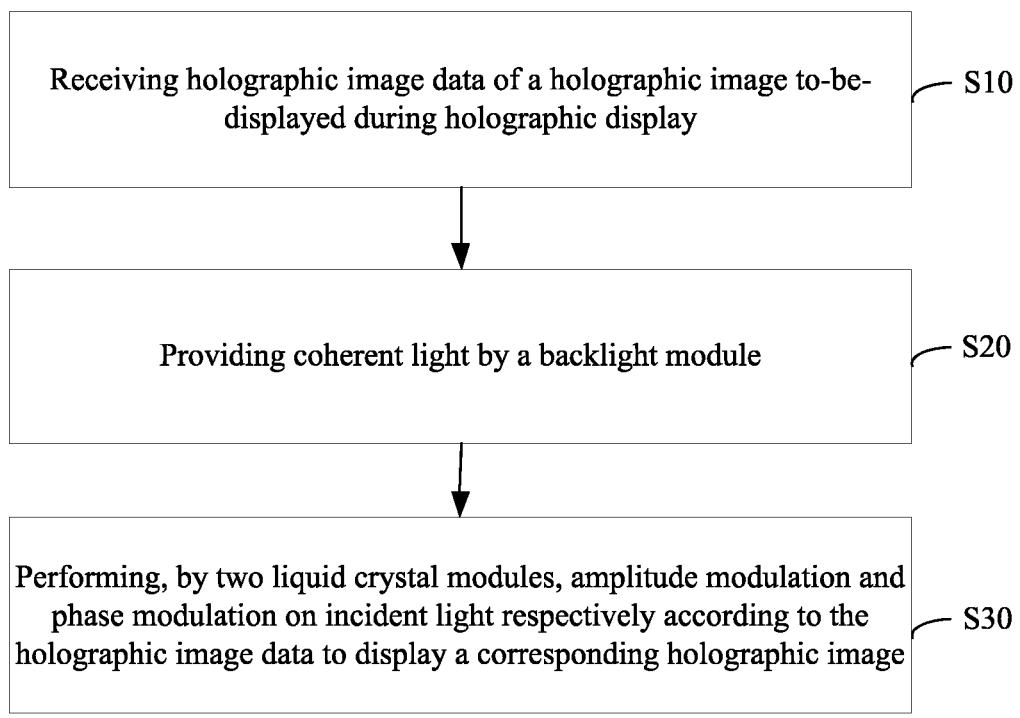
FIG. 13 is a flowchart of a display method of a holographic display device provided by an embodiment of the present disclosure.

In another aspect, the embodiments of the present disclosure provide a display method based on any above holographic display device. FIG. 13 is a flowchart of a display method of a holographic display device provided by the embodiments of the present disclosure.

As shown in FIG. 13, the display method of the holographic display device includes:
S10: receiving holographic data of an image to be displayed during holographic display;
S20: providing coherent light by a backlight module; and
S30: performing amplitude modulation and phase modulation on incident light by two liquid crystal modules respectively according to the holographic data to display a corresponding reconstructed image.

According to the holographic display device provided by the embodiments of the present disclosure, the two liquid crystal modules are stacked, one of the two liquid crystal modules may be controlled to perform amplitude modulation on the coherent light (namely, the reference light of the holographic display) emitted by the backlight module, and the other one of the two liquid crystal modules is controlled to perform phase modulation on the coherent light emitted by the backlight module, so that complex amplitude modulation on a holographic image is implemented, and the image quality of the reconstructed image is improved remarkably by modulating the information in two dimensions.

During specific implementation, the holographic display device includes the backlight module and the two stacked liquid crystal modules located at a light-emitting side of the backlight module, the liquid crystal module configured for performing amplitude modulation on incident light is a first liquid crystal module, and the liquid crystal module configured for performing phase modulation on the incident light is a second liquid crystal module. The holographic display device further includes a processor, and the processor is connected with the backlight module, the first liquid crystal module and the second liquid crystal module respectively. During holographic display, the processor receives holographic data to be displayed sent by an image processor, outputs a driving signal to the backlight module according to the holographic data, to cause the backlight module to emit the coherent light in a set timing, and at the same time, separate out driving signals for performing amplitude modulation and phase modulation on the light according to the holographic data, the processor provides the driving signal for performing amplitude modulation on the light for the first liquid crystal module and provides the driving signal for performing phase modulation on the light for the second liquid crystal module. The first liquid crystal module and the second liquid crystal module adopt the received driving signals to perform amplitude modulation and phase modulation on the coherent light emitted by the backlight module, respectively, so that an effect of performing complex amplitude modulation on the reference light is achieved, and thus the image quality of the reconstructed image formed after modulation is improved.

The emergent light of the backlight module may be the laser light, and the laser light has a better coherence and is suitable for the holographic display. The holographic display device provided by the embodiments of the present disclosure may implement single-color display, and also implement full-color display. During the single-color display, the backlight module only needs to provide laser light of one color, and during the full-color display, the backlight module needs to provide laser light of at least two colors. In general, the backlight module may emit red laser light, green laser light and blue laser light respectively, and the full-color display is implemented in a form of matching three primary colors.

During the full-color display, the processor may provide the driving signal for the backlight module when controlling the backlight module to emit the laser light, and the backlight module emits the laser light with different colors in the set timing under the control of the driving signal.

It may be understood that when the backlight module emits the red laser light, the green laser light and the blue laser light in time division, pixel units in the first liquid crystal module and the second liquid crystal module may modulate the laser light of three colors respectively, and then the full-color display is implemented via the retention effect of human eyes. Each pixel unit rapidly switches and displays red, green and blue, so a plurality of sub-pixel units do not need to be disposed in one pixel unit, in other words, each sub-pixel unit in conventional sense may be used as a pixel unit for use, thus the number of arrangement of the pixel units may be increased, and a display resolution is improved.

For each frame of the image to be displayed, the backlight module emits laser light with different colors in time division in the set timing according to the driving signal provided by the processor. Correspondingly, the first liquid crystal module applies a driving signal corresponding to laser light of a current emitted color to each first sub-pixel unit respectively according to the driving signal provided by the processor, to cause the first liquid crystal module to perform repeated amplitude modulation on the laser light emitted by the backlight module; and the second liquid crystal module applies a corresponding driving signal to each second sub-pixel unit according to the driving signal provided by the processor, to cause the second liquid crystal module to perform phase modulation once on the laser light emitted by the backlight module. The number of times of performing amplitude modulation by the first liquid crystal module is the same as the number of types of colors of laser light emitted by the backlight module.

Description is made by still taking the backlight module emitting the red laser light, the green laser light and the blue laser light in sequence in each frame of image as an example. During the image display, the smallest display unit is a pixel unit, and the first liquid crystal module and the second liquid crystal module need to modulate the emergent light of each pixel unit. As for the amplitude modulation, during the full-color display, intensity modulation needs to be performed on the red light, the green light and the blue light respectively, so different intensities of the light of the three primary colors can be achieved to achieve the corresponding colors. As for the phase modulation, phases generated by one pixel unit are the same, so when one pixel unit emits the red light, the green light and the blue light, it is not necessary to perform phase modulation respectively, and the same phase modulation state only needs to be maintained.

For each frame of image, when the backlight module emits the red laser light, each first sub-pixel unit in the first liquid crystal module needs to perform amplitude modulation once on the red laser light; and at the same time, each second sub-pixel unit in the second liquid crystal module needs to perform phase modulation on the red laser light. When the backlight module emits the green laser light, each first sub-pixel unit in the first liquid crystal module needs to perform amplitude modulation once on the green laser light; and at the moment, each second sub-pixel unit in the second liquid crystal module only needs to maintain the same state of phase modulation on the red laser light. When the backlight module emits the blue laser light, each first sub-pixel unit in the first liquid crystal module needs to perform amplitude modulation once on the blue laser light; and at the moment, each second sub-pixel unit in the second liquid crystal module only needs to still maintain the same state of phase modulation on the red laser light. Clearly, when modulating a frame of image, the first liquid crystal module needs to apply driving signals three times, the second liquid crystal module only needs to apply the driving signal once, and a duration of applying the driving signal once by the second liquid crystal module is equal to a sum of applying the driving signals three times by the first liquid crystal module.

The premise that the holographic display device provided by the embodiments of the present disclosure has high PPI is that the accurate alignment can be performed. Thus, the embodiments of the present disclosure further provide a method for aligning a holographic display device.

Specifically, a first liquid crystal module and a second liquid crystal module may adopt arrangement of three substrates, the first liquid crystal module includes a first substrate and a second substrate disposed opposite to each other, and the second liquid crystal module includes the second substrate and a third substrate disposed opposite to each other. The first liquid crystal module and the second liquid crystal module share the second substrate. Positioning holes are formed in edges of the same sides of the first substrate, the second substrate and the third substrate. During alignment of the above three substrates, a receiver may be disposed at a side of the first substrate facing away from the second substrate, and an emitter may be disposed at a side of the third substrate facing away from the second substrate; the emitter is controlled to emit alignment laser light to the receiver through the positioning holes of the first substrate, the second substrate and the third substrate; and an alignment operation for the substrates of the two liquid crystal modules is completed when a difference between an intensity of the laser light received by the receiver and an intensity of the laser light emitted by the emitter is less than a preset threshold.

During specific implementation, when the intensity of the laser light received by the receiver is 100% or approximate 100% of the intensity of the laser light emitted by the emitter, it may be regarded as alignment of the three substrates reaching a standard.

During actual application, the first substrate may be aligned first, then the second substrate is disposed after alignment of the first substrate is completed, alignment of the second substrate is completed by moving a position of the second substrate; and then the third substrate is disposed, and alignment of the third substrate is completed by moving a position of the third substrate.

The above first liquid crystal module and the second liquid crystal module may also each have two opposite substrates, at the moment, four substrates need to be aligned, and their alignment operations may refer to the above process and will not be described here in detail.

Although preferred embodiments of the present disclosure have been described, those skilled in the art may make extra changes and modifications to these embodiments once they know the basic creative concept. Therefore, the appended claims are intended to be construed as including the preferred embodiments and all changes and modifications falling within the scope of the present disclosure.

Apparently, those skilled in the art may make various modifications and variations to the present disclosure without departing from the spirit and scope of the present disclosure. In this case, if these modifications and variations of the present disclosure fall within the scope of the claims of the present disclosure and their equivalents, the present disclosure is also intended to include these modifications and variations.

What is claimed is:

1. A holographic display device, comprising:
    a backlight module, configured to provide coherent light;
    a first liquid crystal module, located at a light-emitting side of the backlight module; and
    a second liquid crystal module located at a side of the first liquid crystal module facing away from the backlight module;
    wherein the first liquid crystal module is configured for performing amplitude modulation on incident light, and the second liquid crystal module is configured for performing phase modulation on the incident light;
    the first liquid crystal module and the second liquid crystal module comprise:
        a first substrate;
        a second substrate, disposed opposite to the first substrate;
        a third substrate, located at a side of the second substrate facing away from the first substrate;
        a first liquid crystal layer, located between the first substrate and the second substrate;
        a second liquid crystal layer, located between the second substrate and the third substrate;
        a first polarization layer, located at a side of the first liquid crystal module facing away from the second liquid crystal module;
        a second polarization layer, located at a side of the second liquid crystal module facing away from the first liquid crystal module;
        a first orientation layer and a second orientation layer located at two sides of the first liquid crystal layer, respectively; and
        a third orientation layer and a fourth orientation layer located at two sides of the second liquid crystal layer, respectively;
        wherein a polarization direction of the first polarization layer is perpendicular to a polarization direction of the second polarization layer;
        an orientation of first orientation layer is perpendicular to an orientation of the second orientation layer, and an orientation of the third orientation layer is parallel to an orientation of the fourth orientation layer;
        the orientation of the first orientation layer is parallel to the polarization direction of the first polarization layer; and
        the orientation of the fourth orientation layer is parallel to the polarization direction of the second polarization layer.

2. The holographic display device according to claim 1, wherein a thickness of the second substrate is less than 200 μm.

3. The holographic display device according to claim 1, wherein the first liquid crystal module further comprises a plurality of first sub-pixel units, and the second liquid crystal module further comprises a plurality of second sub-pixel units;
    wherein one first sub-pixel unit corresponds to at least one second sub-pixel unit.

4. The holographic display device according to claim 3, wherein second sub-pixel units corresponding to the first sub-pixel unit are distributed in central symmetry with respect to a central point of the first sub-pixel unit.

5. The holographic display device according to claim 4, wherein an orthographic projection of the central point of an opening region of the first sub-pixel unit on the backlight module coincides with an orthographic projection, on the backlight module, of a central point of an opening region of a second sub-pixel unit located in a center among corresponding second sub-pixel units.

6. The holographic display device according to claim 3, wherein a size of the opening region of the first sub-pixel unit is greater than a size of the opening region of the second sub-pixel unit; and
    wherein the size of the opening region of the first sub-pixel unit is greater than or equal to 3 μm, and the size of the opening region of the second sub-pixel unit is greater than or equal to 3 μm.

7. The holographic display device according to claim 3, wherein the first liquid crystal module and the second liquid crystal module further comprise:
    a light shielding layer, located at a side of the third substrate facing the second liquid crystal layer and comprising a plurality of openings exposing opening regions of the second sub-pixel units; and
    a plurality of light-shield support pillars, located between the second substrate and the third substrate and arranged along edges of the opening regions of the second sub-pixel units according to a pattern of the light shielding layer.

8. The holographic display device according to claim 7, wherein an orthographic projection of the light shielding layer on the second substrate completely covers an orthographic projection of each light-shield support pillar on the second substrate.

9. The holographic display device according to claim 7, wherein a shape of each opening of the light shielding layer is a square, a rhombus, a circle, or a regular hexagon.

10. The holographic display device according to claim 1, wherein edges of same sides of the first substrate, the second substrate and the third substrate are provided with a positioning hole, and orthographic projections of positioning holes of the first substrate, the second substrate and the third substrate on the backlight module overlap one another.

11. The holographic display device according to claim 1, wherein emergent light of the backlight module is laser light; and
    wherein the backlight module at least provides laser light of two colors and is configured to emit laser light of different colors in time division.

12. The holographic display device according to claim 1, further comprising:

a processor, connected with the backlight module, the first liquid crystal module, and the second liquid crystal module and configured to control the backlight module to emit the coherent light in a set timing according to holographic image data and provide a driving signal to the first liquid crystal module and the second liquid crystal module, to drive the first liquid crystal module and the second liquid crystal module according to the driving signal to modulate the incident light to achieve holographic display.

13. A display method of a holographic display device, comprising:

receiving holographic data of an image to be displayed during holographic display;

providing coherent light by a backlight module; and performing amplitude modulation and phase modulation on incident light by two liquid crystal modules respectively according to the holographic data to display a corresponding reconstructed image;

wherein the two liquid crystal modules comprise a first substrate and a second substrate disposed opposite to each other, and a third substrate located at a side of the second substrate facing away from the first substrate; edges of same sides of the first substrate, the second substrate and the third substrate are provided with a positioning hole; and the substrates comprised in the two liquid crystal modules are aligned by:

disposing a receiver at a side of the first substrate facing away from the second substrate, and disposing an emitter at a side of the third substrate facing away from the second substrate;

controlling the emitter to emit laser light to the receiver through positioning holes of the first substrate, the second substrate and the third substrate; and completing an alignment operation for the substrates of the two liquid crystal modules in a case that a difference between an intensity of the laser light received by the receiver and an intensity of the laser light emitted by the emitter is less than a preset threshold.

14. The display method according to claim 13, wherein the holographic display device comprises a processor connected with the backlight module and the two liquid crystal modules;

the processor is configured to receive the holographic data of the image to be displayed and generate, according to the holographic data, a driving signal used for controlling the backlight module and the two liquid crystal modules;

the backlight module emits the coherent light in a set timing according to the driving signal provided by the processor; and the two liquid crystal modules perform amplitude modulation and phase modulation on the incident light of the backlight module respectively according to the driving signal provided by the processor.

15. The display method according to claim 14, wherein the backlight module is configured to emit laser light of at least two colors, the liquid crystal module configured for performing amplitude modulation on the incident light is a first liquid crystal module, and the liquid crystal module configured for performing phase modulation on the incident light is a second liquid crystal module; the first liquid crystal module comprises a plurality of first sub-pixel units, and the second liquid crystal module comprises a plurality of second sub-pixel units;

emitting, by the backlight module, the coherent light in the set timing according to the driving signal provided by the processor comprises:

for each frame of an image to be displayed, emitting, by the backlight module, laser light of different colors in time division in the set timing according to the driving signal provided by the processor; and performing, by the two liquid crystal modules, amplitude modulation and phase modulation on the incident light of the backlight module respectively according to the driving signal provided by the processor comprises:

for each frame of the image to be displayed, applying, by the first liquid crystal module, a driving signal corresponding to laser light of a current emitted color to each first sub-pixel unit according to the driving signal provided by the processor, to cause the first liquid crystal module to perform repeated amplitude modulation on the laser light emitted by the backlight module;

wherein a quantity of times of performing amplitude modulation by the first liquid crystal module is same as a quantity of types of colors of laser light emitted by the backlight module; and applying, by the second liquid crystal module, a corresponding driving signal to each second sub-pixel unit according to the driving signal provided by the processor, to cause the second liquid crystal module to perform phase modulation once on the laser light emitted by the backlight module.

* * * * *